Sept. 13, 1932.  O. CORDS  1,877,497
DEEP SEA CABLE
Filed Dec. 3, 1929

O. Cords
INVENTOR
By Marks & Clerk Attys.

Patented Sept. 13, 1932

1,877,497

UNITED STATES PATENT OFFICE

OTTO CORDS, OF COLOGNE-MULHEIM, GERMANY, ASSIGNOR TO FELTEN & GUILLEAUME CARLSWERK ACTIEN-GESELLSCHAFT, OF COLOGNE-MULHEIM, GERMANY

DEEP SEA CABLE

Application filed December 3, 1929, Serial No. 411,375, and in Germany December 13, 1928.

For taking up the water pressure deep sea cables are provided with pressure protecting means consisting of a hollow rope formed of laid section wires. This hollow rope is not completely rigid, but decreases in diameter as the pressure increases. Although this decrease in the diameter is only slight, it causes a small gap to form at the place where the hollow rope for instance enters the rigid branch of the pressure-resisting body of a pupin coil sleeve, which may be the cause of a deformation of the outer lead sheath and consequently of a leakage. For preventing this, the object of the present invention is to provide means for giving the leading-in end of the pressure-resisting body of the pupin coil sleeve the property of decreasing its diameter as the water pressure increases. This may for instance be effected by a number of longitudinal slots being sawn into the branch parallel to the axis of the sleeve end, the slots being filled with a relatively soft compressible material, for instance lead. The diameter of such a sleeve end will decrease where it merges into the hollow rope to the same extent as the hollow rope under the action of the water pressure, a portion of the lead in the slots being forced out.

Figure 1:
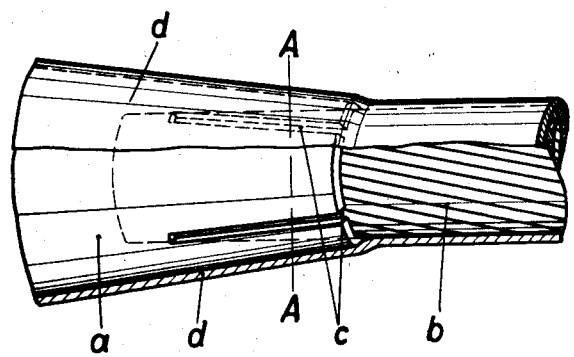
Figure 2:
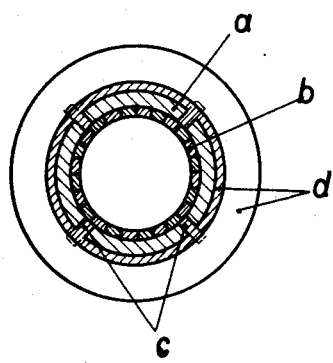

In the constructional example shown in the accompanying drawing Figure 1 is an elevation of the improved junction with the lead sheathing partly removed and Figure 2 is a section along the line A—A in Figure 1 seen from the right hand side. *a* is the pressure-resisting body of the sleeve, the end of which is introduced into the hollow protective rope *b* of the cable. *c* are the longitudinal slots cut into the end of the body *a* and *d* is the lead sheathing. The lead filling in the slots *c* can be seen in Figure 2.

What I claim is:

1. In submarine cables a junction between a pressure protecting hollow rope and a rigid sleeve, both of which are surrounded by a common outer lead sheathing, the said sleeve having a conical end with a number of longitudinal slots cut therein and distributed around it, the said slotted end being left unclamped so that owing to its elasticity it can accommodate itself to the decrease in diameter of the hollow rope under increased pressure, as and for the purpose set forth.

2. In submarine cables a junction between a pressure protecting hollow rope and a rigid sleeve, both of which are surrounded by a common outer lead sheathing, the said sleeve having a conical end with a number of longitudinal slots cut therein and distributed around it, the said slots being filled with a compressible sealing material and the whole of the slotted end being left unclamped so that owing to its elasticity it can accommodate itself to the decrease in diameter of the hollow rope under increased pressure, as and for the purpose set forth.

In testimony whereof I have signed my name to this specification.

OTTO CORDS.